United States Patent [19]

Kostman

[11] 3,830,543
[45] Aug. 20, 1974

[54] DUMP VEHICLE

[76] Inventor: Wilmer A. Kostman, Rt. 1, Box 185, Barnsville, Minn. 56514

[22] Filed: Nov. 19, 1973

[21] Appl. No.: 416,850

[52] U.S. Cl............................ 298/10, 298/11, 298/14
[51] Int. Cl............................ B60p 1/32, B62p 1/34
[58] Field of Search............ 298/10, 11, 18, 12, 14, 298/16

[56] References Cited
UNITED STATES PATENTS

| | | | |
|---|---|---|---|
| 2,815,980 | 12/1957 | Harbers | 298/14 |
| 3,041,112 | 6/1962 | Carmichael | 298/11 |
| 3,083,058 | 3/1963 | Walstrom | 298/5 X |
| 3,205,011 | 9/1965 | Diem | 298/10 |
| 3,228,727 | 1/1966 | Paulson | 298/10 |
| 3,236,562 | 2/1966 | Maxon | 298/18 |
| 3,633,971 | 1/1972 | Berky | 298/10 |

*Primary Examiner*—Richard J. Johnson

[57] ABSTRACT

A wagon for transporting and dumping material having an improved dumping mechanism which provides a relatively low and stable transport position of the material container while providing a relatively high dumping position of the container, in which the pouring edge along the side of the container is significantly higher in the dumping position than in the transport position. A moveable guide member and a connecting link cooperate when actuated by a hydraulic ram to move the material container outward along a pivot arm, thereby providing the increase in dumping height as the hydraulic ram further rotates the pivot arm to dump the container.

13 Claims, 4 Drawing Figures

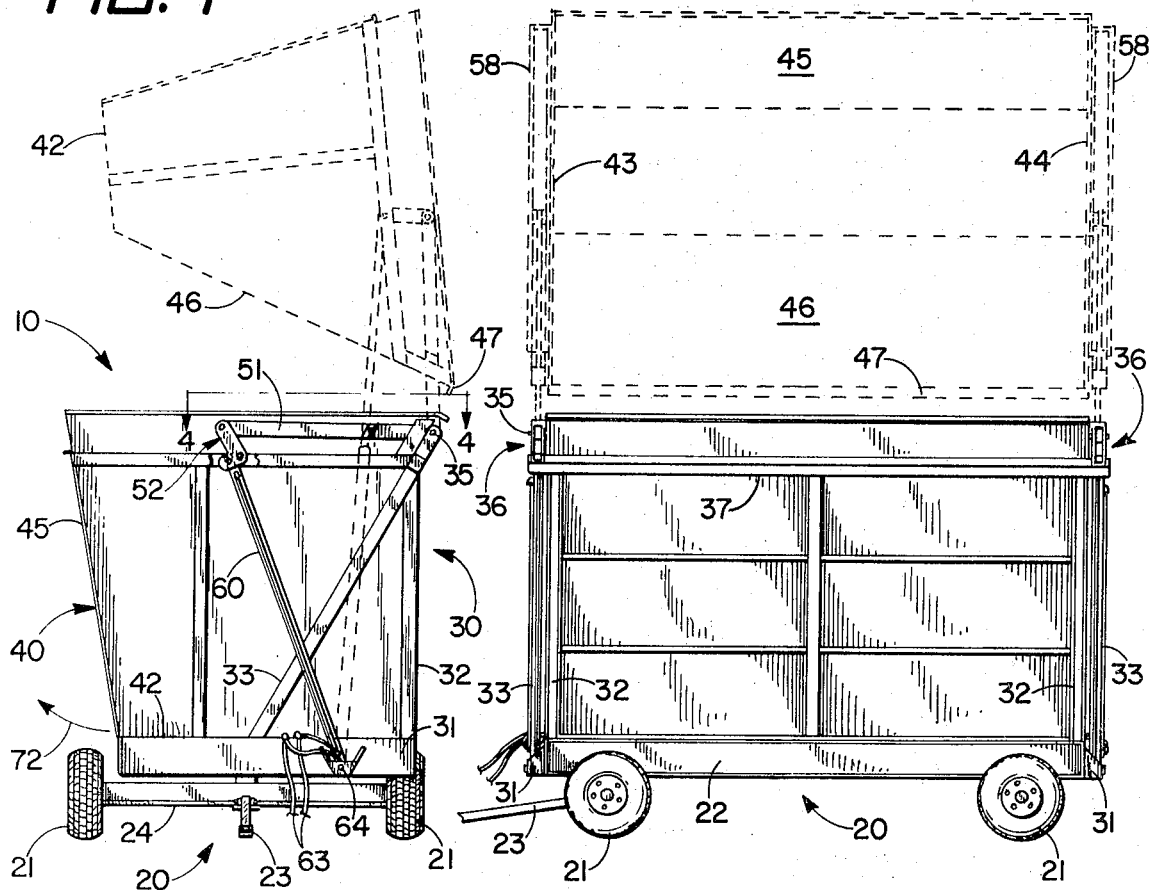
FIG. 1
FIG. 2
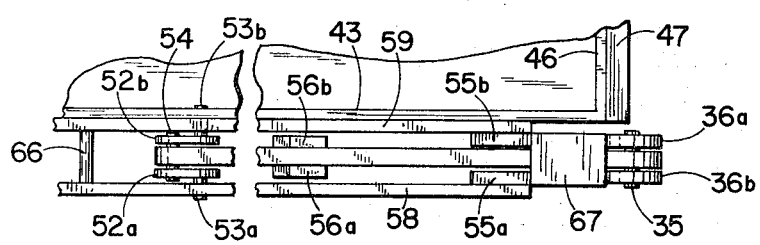
FIG. 4
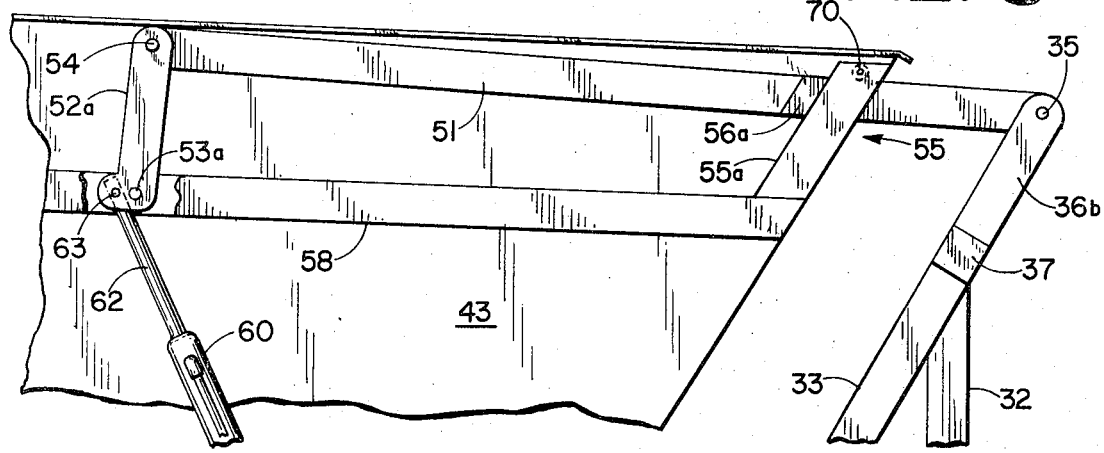
FIG. 3

DUMP VEHICLE

BACKGROUND OF THE INVENTION

The present invention pertains generally to the field of dumping wagons, and more particularly to dump wagons for agricultural and other uses in which it is necessary to provide a relatively high dumping position for the material container while maintaining a relatively low transport position for the container.

Dump vehicles of this type are widely used for agricultural purposes, wherein the vehicle often takes the form of a wagon adapted to be drawn behind a farm tractor. The wagon has a relatively tall sided material container, often having sloping sides so that all the material will pour out when the container is dumped. It is generally desirable in such wagons to provide a dumping mechanism so that when the container is dumped, the pouring edge along one side of the container will be elevated to a fairly high position to facilitate dumping grain and the like into high sided trucks or storage bins. At the same time, it is desirable to provide a relatively low transport position for the container so that the stability of the wagon as it moves over uneven ground will be improved, and so that no clearance problems are created by the wagon which would impair its usefulness in conjunction with other farm implements such as combines, and so that it is not too tall to fit into storage buildings.

The conflicting design requirements for a low transport height and a high dumping height have led to a number of prior art dumping wagons. One prior art wagon is shown in U.S. Pat. No. 3,083,058 issued to Walstrom et al on Mar. 26, 1963. This patent uses an upright slanting rail assembly and a first pair of hydraulic rams to move the container up the rail assembly to gain the additional dumping height, then a second pair of hydraulic cylinders to dump the container. This structure, however, suffers from the disadvantages of requiring extra actuators, thereby increasing cost, and also from the disadvantage of requiring high vertical clearance for the rail assembly even when the container is in its down position.

Another prior art approach to the problem is illustrated by U.S. Pat. No. 3,205,011, issued to Diem on Sept. 7, 1965. In this structure, the gain in dumping height is achieved by rigidly affixing the material container on a pivot arm a distance from the pivot point of the arm. The distance away from the pivot point that the pouring edge is positioned equals the gain in dumping height as the pivot arm is rotated upward. A disadvantage of this structure is that if a significant height increase is to be achieved, the container must be displaced to the side of the wagon, thereby leading to either excessive width of the wagon or else reduced volume of the material container. Another disadvantage is that the center of gravity of the wagon is shifted toward one side during transportation, adversely affecting stability when the wagon is drawn over uneven ground.

Another example of a prior art dumping wagon is shown in my prior patent application Ser. No. 276,719, filed July 31, 1972. The farm wagon shown in that patent application achieves its vertical dumping height because the hinges for dumping the container are mounted on struts which telescopically extend upward and outward from slanted support members mounted on the wagon. With this telescoping strut arrangement, the hydraulic actuating ram must be substantially parallel to the telescoping action. This requires that the bottom end of the ram be attached to the wagon frame near the side opposite the dumping side. One disadvantage with this arrangement is that the positioning of the hydraulic ram effectively blocks the lower portion of the ends of the container, thereby precluding the use of an auger for emptying the wagon, which is in some applications preferable to dumping. According to my present invention, the hydraulic actuating ram is mounted to the wagon frame near the dumping side, so that the other side is not blocked, leaving ths possibility of providing an auger if desired.

Another feature of the wagon shown in my earlier filed application which may be a disadvantage in some operating circumstances is the shift in center of gravity during dumping which transfers most of the weight to the wheels on the dumping side, leaving the wagon with only marginal stability. This transfer of weight is caused in part by the fact that the telescoping members slat outwardly as well as upwardly, thereby positioning the entire material container toward the side. In my present invention, the dumping mechanism does not move the container so far to the side of the vehicle as to impair its stability during dumping.

SUMMARY OF THE INVENTION

According to the present invention there is provided an improved dump vehicle having a wheeled transport carriage and a material container mounted on the carriage for transportation in a relatively low position, and for dumping toward the side in a relatively high dumping position. The dumping mechanism to achieve this result comprises a support frame which is attached to the carriage, and a pivot arm pivotally attached to the support frame. The container is supported in part from the pivot arm by means of a guide member which moveably engages the pivot arm. A connecting link is pivotally attached to the container, and has one end pivoted to the pivot arm, remote from the point of attachment of the pivot arm to the support frame. The other end of the connecting link is attached to an extensible member, which in the preferred embodiment is a hydraulic ram. During actuation, the extensible member exerts a force on the connecting link which causes the container to move along the pivot arm away from the pivot point until a stop member on the pivot arm is engaged by the guide member. This outward movement provides the gain in dumping height as the extensible member continues to apply the actuating force to rotate the pivot arm and container about the pivot point and up to the dumping position.

BRIEF DESCRIPTION OF THE DRAWINGS

FIG. 1 is a front elevational view of a dump wagon according to the present invention;

FIG. 2 is a side elevational view of the wagon shown in FIG. 1;

FIG. 3 is a detail in part of the dumping mechanism of the wagon shown in FIG. 1; and FIG. 4 is a top view of the dumping mechanism of FIG. 3.

DETAILED DESCRIPTION OF THE PREFERRED EMBODIMENT

Referring to FIGS. 1–4 wherein like numerals refer to like structural elements, reference numeral 10 designates a transporting and dumping wagon which comprises a material container 40 and a wheeled transport carriage 20. In FIGS. 1 and 2, material container 40 is shown in its transport position (solid lines), and also in its dumping position (broken lines). A support frame 30 is rigidly attached to wheeled transport carriage 20 and serves to support container 40 in its dumping position, and to provide lateral stability to the container in its transport position. Wheeled transport carriage 20 comprises a main frame 22, four wheels 21 attached to axles 24, and a draw bar 23. Of course other types of vehicles or carriages could be used in conjunction with the container and dumping mechanism of the present invention.

As shown in FIGS. 1 and 2, container 40 has an elongated shape with a base 42, vertical front and back walls 43 and 44 respectively, a side wall 45 which slants slightly inwardly toward the bottom of container 40, and a side wall 46 which slants more sharply inwardly toward the bottom of container 40. While other shapes may be used for container 40, the inward slanting of side wall 46 is preferred because it provides a steep incline which facilitates the flow of material out of container 40 when it is moved to its dumping position. The top edges of walls 43–46 define an opening in the top of the container. Pouring edge 47 of container wall 46 in the edge nearest the axis about which the container pivots when it is moved to its dumping position, and is the pouring edge over which material flows. When container 40 is moved to its dumping position, the opening in the top of the container is in a nearly vertical plane, and the pouring edge 47 extends only slightly outwardly from the position which it occupies in its transport position. This helps maintain the center of gravity of container 40 near the center line of carriage 20 during dumping so that the wagon does not become dangerously unstable. The container 40 does not need to be positioned to where the opening is fully vertical since side wall 46 is inclined so that most material tends to flow down and out.

As shown in FIGS. 1 and 2, support frame 30 has identical structures located at either end of the wagon carriage and in this description a single numeral will be used to designate like structural elements at either end of the container. As shown in FIG. 1, the support frame comprises a vertical strut 32, and a transverse strut 33, both having lower ends rigidly attached to a frame base 31 which in turn is mounted to the transport carriage. The upper ends of struts 32 and 33 are connected to each other. Struts 32 and 33 and frame base 31 thus define a triangular structure at each end of the wagon. These two triangular structures are tied together by a tie member 37 which provides longitudinal support between vertical struts 32 at each end of the wagon. Tie member 37 is attached to the top ends of vertical struts 32 where they join transverse struts 33.

The dumping mechanism, which is shown in detail in FIGS. 3 and 4, is identical at both ends of the wagon, and only one end will be described here. As shown in FIG. 3, a pivot arm 51 is provided. The right end of pivot arm 51 is pivotally pinned between the blades 36a and 36b of a forked member 36, by pin 35. Forked member 36 is attached to the end of tie member 37, and extends upwardly and outwardly from the surface of tie member 37 in a direction parallel to transverse strut 32, as shown in FIGS. 2 and 3. Pin 35 extends between the fork blades 36a and 36b near their upper ends and serves as a pivot point for container 40 as it moves to its dumping position. The location of pivot pin 35 relative to carriage 20 remains fixed during the transport and dumping of container 40. The location of pin 35 near a vertical plane through wheels 21 helps maintain the center of gravity of container 40 near the center line of carriage 20 during the dumping operation, so as to prevent tipping of the wagon which might occur if the pivot point were more outboard.

The other end of pivot arm 51 is connected to a connecting link 52, which in the preferred embodiment comprises a bell crank. The manner in which the bell crank is attached to the container is best seen in FIG. 4. In FIG. 4, the top edge of end wall 43 and side wall 46 of the container are shown. A pair of support rails 58 and 59 are rigidly attached to end wall 43 of container 40. Support rail 59 which is immediately adjacent the outside of wall 43 may be welded or bolted in place. Support rail 59 is spaced apart from rail 59 and held rigidly in place by a plurality of bolts, one of which is shown at 66 of FIG. 4. For purposes of clarity, the other bolts have been omitted from the drawing, but a plurality of bolts between rails 59 and 58 may be used as required along the lengths thereof. As shown in FIG. 4, the bell crank 52 has two halves, 52a and 52b, which are disposed on either side of the end of pivot arm 51 and are pivoted thereto by a pin 54. The bell crank halves 52a and 52b are pivotally connected to rails 58 and 59, respectively, by pins 53a and 53b. The other ends of bell cranks 52a and b, which angle away from pivot arm 51, are connected to a rod 62 of a hydraulic cylinder 60, by means of a pivot pin 63.

Attached to guide rails 58 and 59, near the right ends thereof is a guide member 55. As shown in FIGS. 3 and 4, guide member 55 comprises a pair of brackets 55a and 55b positioned on either side of pivot arm 51, and welded to support rails 58 and 59, respectively. Brackets 55a and b slant upward and to the right parallel to the edge of the container and support strut 33. The tops of brackets 55a and 55b are connected by a top member 67 which may be welded thereto. Top member 67 slideably engages the top surface of pivot arm 51. Alternatively, a guide roller 70 may be positioned between brackets 55a and 55b to engage the pivot arm. Whether a guide roller is used or not, it will be appreciated that a substantial portion of the weight of container 40 will be transferred to pivot arm 51 and thence to the support frame 30 by means of guide member 55, which is attached to the container. It will further be appreciated that the guide member 55 is configured to allow movement along pivot arm 51. The innermost position of the container along pivot arm 51 is limited by the abutment of side 46 of the container against transverse strut 33. The outward limit of travel of the container along pivot arm 51 is limited by a pair of stop blocks 56a and 56b welded to pivot arm 51. In FIG. 4, and in the solid lines of FIG. 1, the dumping mechanism is shown with the container in the transport position, with the guide member fully to the right toward the pivot point. In FIG. 3, and in the dotted lines of FIG. 1, the container has moved to its maximum outward position, wherein guide brackets 55 have butted against stop blocks 56. The actuation means for causing this outward movement of container 40 on pivot arm 51, and for causing the subsequent rotation of pivot arm about pin 35 to the dumping position is described in detail in a subsequent paragraph. However, it will be appreciated that the movement of the guide member from the pivot point to the stop block allows the pouring edge 47 to be elevated by an equal distance to provide a gain of height when the container is in its dumping position.

As shown in FIG. 1, the other end of hydraulic cylinder 60 is connected to the frame base 31 and thence to the transport carriage by a pin 64. Hydraulic lines 63 are provided for connection to the hydraulic system on the tractor. It will be appreciated that together, connecting link 52 and hydraulic ram 60 provide the actuation means for moving the container outward on the pivot arm, and for rotating the pivot arm to dump the container. It will also be appreciated that in its broadest concept, the present invention contemplates embodiments in which separate actuators may be used to move the container outward on the pivot arm, and other independent actuators may be used to rotate the pivot arm, and container to the dumping position. However, such embodiments are not preferred because they unnecessarily require four separate actuators (two at each end). Through use of the connecting link 52, which comprises a bell crank in the preferred embodiment, a single actuator (a pair of actuators, considering both ends) performs the dual function of moving the container outward on the pivot arm and rotating the pivot arm to the dumping position. Of course other means of applying the actuation force to the connecting link could be used, such as electric motors, mechanical rack and pinion assemblies, or the like.

The operation of the transporting and dumping wagon 10 of FIGS. 1–4 is as follows. After material has been loaded into container 40, the wagon may be moved to the desired unloading position by means of transport carriage 20. A hydraulic valve on the tractor controlling ram 60 is activated to begin extension of the ram. It will be seen with reference to FIG. 3 that the initial extension force applied to the bell crank will tend to cause clockwise rotation thereof about the pivot points 53a and b. However, since pivot arm 51 is constrained by pin 35 and the support frame 30, it cannot move to the right as urged by the bell crank. Instead, force transmitted through pins 53 to the container cause the entire container to move towards the left in FIG. 3. This motion is permitted by the guide member 55 which, although providing load bearing ability in the vertical direction, allows free sliding movement along pivot arm 51 until the stop blocks 56 are engaged. During this initial movement just described, the bottom of container 40 moves outward as indicated by arow 72 in FIG. 1, before any substantial upward movement is experienced. After the guide member 55 has engaged the stop blocks 56, the entire mechanism through bell crank 52, pivot arm 51 and guide member 55 becomes in effect a rigid system. Continued extension of ram 60 therefore causes the entire assembly of container 40 and pivot arm 51 to rotate upwardly about the pivot point 35 to the dumping position as indicated by the dotted lines in FIGS. 1 and 2. After dumping is completed, the hydraulic ram is retracted and the container returns to its transport position by rotating downward, then moving inward on the pivot arm until the wall 46 of the container butts against the transverse strut 33, and the bottom 42 rests firmly on the frame base 31. In this position the container is well stabilized for the transport operation.

It will be appreciated that the geometry of the various linkages of the dumping mechanism must be carefully chosen in order to give the desired height and dumping position. While variations in the geometry can easily be made according to the requirements of different wagon designs, the significant dimensions of one successful embodiment according to the present invention are includes by way of example. In the following dimensions, where pivot pins are specified, the noted distance is measured to or from the center of the pin. On one successful embodiment, the unextended distance between ram cylinder pivot 64 and pivot 63 of the bell crank was 84 inches. The bell crank 52 measured 12 inches between pivot pins 53 and 54. Pivot pin 63 has two and ⅝ inches from pivot pin 53, measured on a line approximately perpendicular to a line between the centers of pivot pins 53a and 54. The distance between pivot pin 54 and pivot pin 35 on pivot arm 51 was 67 inches. The impact edge on stop block 56a and b was 16 inches from the center of pivot pin 35. Pivot pin 35 was 91 inches from pivot pin 64 at the bottom of the hydraulic ram. In this example, the height of the dumping edge 47 above ground level was approximately 10½ feet, which was approximately 16 inches higher than it would have been were it not for the height gain provided by the dumping mechanism of the present invention.

Referring to FIG. 1, the slight incline of side 55 of container 40 is preferred so as to provide wheel clearance for wheel 21, since the initial movement of the container is outward to the left of FIG. 1. Also, as shown in FIG. 1, since hydraulic ram 60 extends downward to the right, the lower portion of either end of the container is free for mounting an auger for removal of material, if desired. This is not practicable in the wagon disclosed in my earlier filed application identified above, because the hydraulic ram slants downward to the left, thereby blocking the end of the container. The dumping mechanism of the present invention also allows the use of a smaller and less expensive hydraulic ram than my earlier invention, because the effective lever arm through which the ram works about the pivot point is greater in the present invention, giving a greater mechanical advantage.

Because the action of the dumping mechanism according to the present invention causes the container to move outward on the pivot arm to gain the additional pouring height, the disadvantage of either increased transport carriage width or reduced container volume, and the disadvantage of further offset in the center of gravity in the transport position as in the Diem patent, noted above, are avoided.

The dumping mechanism according to the present invention provides the double advantage of having a low center of gravity for container 40 in its transport position while still providing an elevated height to pouring edge 47 in its dumping position. In addition, since the pivot pin 35 remains in a fixed location relative to carriage 20, tce center of gravity of container 40 is kept relatively near the center line of carriage 20. This presents a more stable dumping position as compared to the situation resulting in my earlier invention described above, wherein the pivot point moves outboard from its transport position during the dumping operation, thereby reducing stability during the dumping operation.

I claim:

1. A dumping mechanism for a dump vehicle having a wheeled transport carriage and a material container moveable thereon from a transport position to a dumping position, comprising:
   a. a support frame attached to the wheeled transport carriage;
   b. a pivot arm pivotally connected to said support frame;
   c. means attached to said material container at an upper portion thereof for mounting said material container to said pivot arm with one side of said container adjacent the pivot point for relative movement of the container therealong between a transport position toward the pivot point and a dumping position away from the pivot point, said mounting means providing at least partial support for the material container; and
   d. actuation means operably connected for moving the material container along the pivot arm away from the pivot point to the dumping position and for rotating the pivot arm to dump the material container.

2. A dumping mechanism according to claim 1 wherein said mounting means includes a guide member attached to the container and moveably engaging said pivot arm for support thereby.

3. A dumping mechanism according to claim 2 wherein said pivot arm includes a stop member engageable by said guide member when the container has moved a predetermined distance away from the pivot point.

4. A dumping mechanism according to claim 2 wherein said guide member comprises a pair of brackets spaced on either side of said pivot arm, and a roller attached between said brackets for engaging the top surface of said pivot arm.

5. A dumping mechanism according to claim 4 further including a pair of stop blocks attached to said pivot arm for engagement by said brackets when the container is moved to its dumping position.

6. A dumping mechanism according to claim 1 wherein said actuation means includes a bell crank pivotally connected to the container and having one end pivotally connected to said pivot arm, and wherein said actuation means further includes means for applying an actuation force to the other end of the bell crank.

7. A dumping mechanism according to claim 6 wherein said force applying means comprises a hydraulic ram connected between said other end of the bell crank and the wheeled transport carriage.

8. A dump vehicle comprising:
   a. a wheeled transport carriage;
   b. a material container;
   c. a support frame attached to said wheeled transport carriage;
   d. a pivot arm;
   e. means for mounting said material container to said pivot arm for relative movement of the container therealong between a transport position toward the pivot point and a dumping position away from the pivot point, said mounting means providing at least partial support for the material container;
   f. a connecting link pivotally connected to said material container and to said pivot arm; and
   g. an extensible member connected to said wheeled transport carriage and to said connecting link for applying the actuating force to move the material container along the pivot arm to its dumping position, and to rotate the pivot arm to dump the material container.

9. A dump vehicle according to claim 8 wherein said mounting means includes a guide member attached to the container and moveably engaging said pivot arm for support thereby.

10. A dump vehicle according to claim 8 wherein said connecting link comprises a bell crank having ends pivotally connected to said pivot arm and to said extensible member.

11. A dump vehicle according to claim 10 wherein said extensible membr comprises a hydraulic ram connected between the wheeled transport carriage and the connecting link.

12. A dump vehicle according to claim 8 wherein said material container has a pouring edge formed on the top edge of one side of the container, and wherein said one side slopes downwardly from the pouring edge and inwardly toward the interior of said material container when the container is in its transport position, said sloping side thereby forming an inclined ramp to urge material downwardly when said container is in its dumping position.

13. A dump vehicle according to claim 12 wherein said support frame comprises at least one transverse support strut sloping upwardly from said wheeled transport carriage along a line parallel to said sloping side of the container in its transport position, said transverse support strut for abutment by and stabilization of said container in its transport position.

* * * * *